(12) United States Patent
Huang et al.

(10) Patent No.: US 9,441,797 B2
(45) Date of Patent: Sep. 13, 2016

(54) LENS DEVICE AND LIGHT SOURCE MODULE USING THE SAME

(71) Applicant: Lextar Electronics Corporation, Hsinchu (TW)

(72) Inventors: Chih-Min Huang, New Taipei (TW); Kuang-Neng Yang, Hsinchu County (TW); Kun-Hua Wu, Zhubei (TW)

(73) Assignee: LEXTAR ELECTRONICS CORPORATION, Hsinchu (TW)

( * ) Notice: Subject to any disclaimer, the term of this patent is extended or adjusted under 35 U.S.C. 154(b) by 138 days.

(21) Appl. No.: 14/219,037

(22) Filed: Mar. 19, 2014

(65) Prior Publication Data

US 2015/0062922 A1 Mar. 5, 2015

(30) Foreign Application Priority Data

Sep. 4, 2013 (TW) .............................. 102131852 A

(51) Int. Cl.
| | |
|---|---|
| *F21V 5/04* | (2006.01) |
| *F21K 99/00* | (2016.01) |
| *G02B 5/02* | (2006.01) |
| *G02B 19/00* | (2006.01) |
| *G02B 5/00* | (2006.01) |

(Continued)

(52) U.S. Cl.
CPC . *F21K 9/50* (2013.01); *F21V 5/04* (2013.01); *G02B 5/003* (2013.01); *G02B 5/0247* (2013.01); *G02B 19/0014* (2013.01); *G02B 19/0066* (2013.01); *G02B 19/0071* (2013.01); *F21V 11/00* (2013.01); *F21Y 2101/02* (2013.01)

(58) Field of Classification Search
CPC .......... G02B 19/0071; G02B 19/0066; G02B 19/0014; G02B 5/0247; G02B 6/0041; F21Y 2101/02; F21V 5/04; F21V 7/22; F21V 3/04; F21V 3/0472; F21V 3/049; F21K 9/50
USPC .................................................... 362/311.02
See application file for complete search history.

(56) References Cited

U.S. PATENT DOCUMENTS

| | | |
|---|---|---|
| 7,726,828 B2 | 6/2010 | Sato |
| 8,102,600 B2 * | 1/2012 | Shyu .................... G02B 3/0037 359/621 |
| 8,345,185 B2 | 1/2013 | Han et al. |

(Continued)

FOREIGN PATENT DOCUMENTS

| | | |
|---|---|---|
| TW | 200946819 A1 | 11/2009 |
| TW | I349756 | 10/2011 |

(Continued)

OTHER PUBLICATIONS

English Abstract translation of TWI349756 (Published Oct. 1, 2011).

(Continued)

*Primary Examiner* — Peggy Neils
(74) *Attorney, Agent, or Firm* — McClure, Qualey & Rodack, LLP

(57) ABSTRACT

A lens device and a light source module using the same are provided. The lens device comprises a lens and a patterned light shielding layer. The lens has a middle light emitting surface and a periphery light emitting surface surrounding the middle light emitting surface. The patterned light shielding layer is formed on the periphery light emitting surface of the lens.

19 Claims, 3 Drawing Sheets

(51) Int. Cl.
*F21V 11/00* (2015.01)
*F21Y 101/02* (2006.01)

(56) References Cited

U.S. PATENT DOCUMENTS

| | | | | |
|---|---|---|---|---|
| 8,506,103 | B2* | 8/2013 | Iimura | F21K 9/135 |
| | | | | 362/254 |
| 8,820,951 | B2* | 9/2014 | Yriberri | F21V 5/04 |
| | | | | 362/256 |
| 8,827,492 | B2* | 9/2014 | Yamamoto | G02B 6/0021 |
| | | | | 362/241 |
| 9,163,819 | B2* | 10/2015 | Dassanayake | F21V 9/00 |
| 2008/0170409 | A1* | 7/2008 | Tendo | F21S 48/1283 |
| | | | | 362/538 |
| 2010/0259916 | A1* | 10/2010 | Sun | H01L 33/60 |
| | | | | 362/84 |
| 2011/0051250 | A1* | 3/2011 | Fujita | B23K 26/0084 |
| | | | | 359/601 |
| 2011/0069496 | A1* | 3/2011 | Ing | B29D 11/00798 |
| | | | | 362/311.02 |
| 2012/0091876 | A1* | 4/2012 | Hsiao | F21V 3/049 |
| | | | | 313/46 |
| 2012/0147277 | A1 | 6/2012 | Yamamoto et al. | |
| 2013/0094216 | A1* | 4/2013 | Sato | F21V 7/0025 |
| | | | | 362/297 |
| 2014/0268815 | A1* | 9/2014 | Li | G02B 6/001 |
| | | | | 362/311.02 |
| 2014/0286019 | A1* | 9/2014 | Araki | G02B 19/0023 |
| | | | | 362/311.09 |
| 2014/0328085 | A1* | 11/2014 | Johnson | F21S 10/00 |
| | | | | 362/644 |
| 2015/0092434 | A1* | 4/2015 | Satake | B60Q 3/004 |
| | | | | 362/511 |
| 2015/0167927 | A1* | 6/2015 | Burt | F21V 3/02 |
| | | | | 362/311.1 |

FOREIGN PATENT DOCUMENTS

TW 201207505 A1 2/2012
WO 2013116548 A1 8/2013

OTHER PUBLICATIONS

TIPO Office Action dated Nov. 17, 2015 in corresponding TW application (No. 102131852).

* cited by examiner

LENS DEVICE AND LIGHT SOURCE MODULE USING THE SAME

This application claims the benefit of Taiwan application Serial No. 102131852, filed Sep. 4, 2013, the subject matter of which is incorporated herein by reference.

BACKGROUND OF THE INVENTION

1. Field of the Invention

The invention relates in general to a lens device and a light source module using the same, and more particularly to a lens device with light shielding layer and a light source module using the same.

2. Description of the Related Art

In a conventional light emitting device, light emitted from LED is normally diffused or concentrated through a lens. However, after the light emitted from LED passes through the lens, the light is normally outputted in two colors, making the light color non-uniform.

SUMMARY OF THE INVENTION

The invention is directed to a lens device and a light source module using the same capable of resolving the problem of the emitted-light color being non-uniform.

According to one embodiment of the present invention, a lens device is provided. The lens device comprises a lens and a patterned light shielding layer. The lens has a middle light emitting surface and a periphery light emitting surface surrounding the middle light emitting surface. The patterned light shielding layer is formed on the periphery light emitting surface of the lens.

According to another embodiment of the present invention, a light source module is provided. The light source module comprises a light emitting diode (LED) and a lens device. The lens device is disposed on an optical path of the LED. The lens device comprises a lens and a patterned light shielding layer. The lens has a middle light emitting surface and a periphery light emitting surface surrounding the middle light emitting surface. The patterned light shielding layer is formed on the periphery light emitting surface of the lens.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
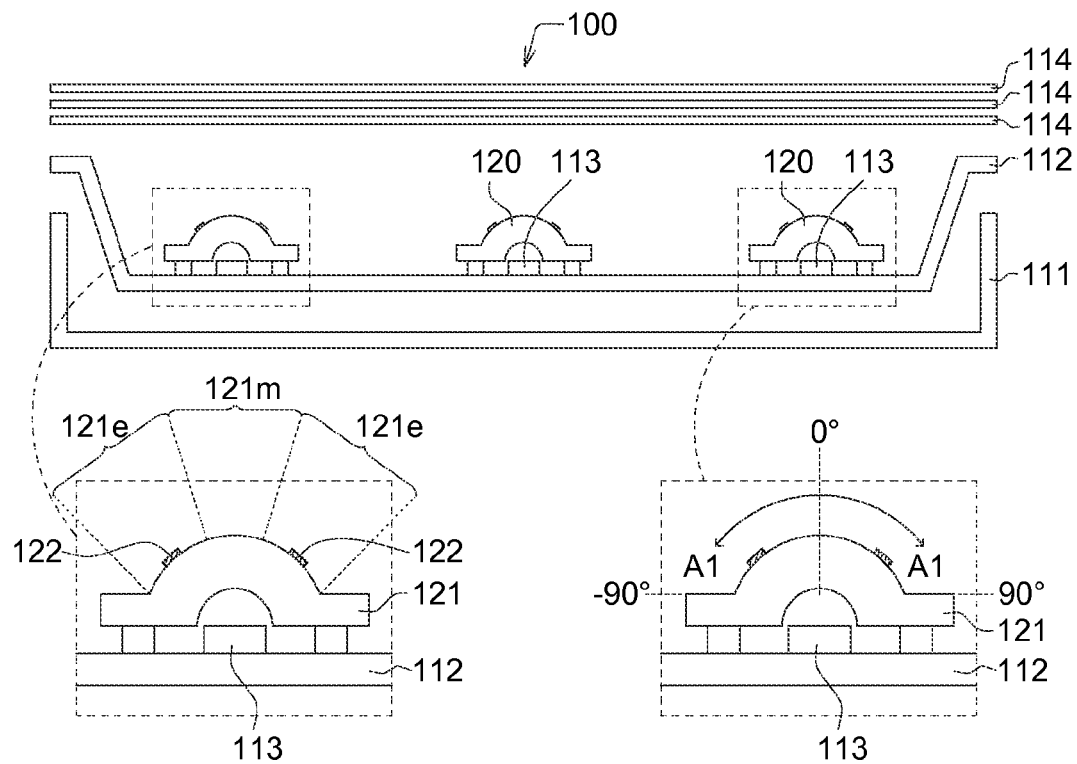
FIG. 1 is an explosion diagram of a light source module according to an embodiment of the invention.

Referring to FIG. 1, an explosion diagram of a light source module according to an embodiment of the invention is shown. The light source module 100 can be realized by such as a backlight module. To be more specifically, the light source module 100 is a direct type backlight module. The light source module 100 comprises a back plate 111, a reflector 112, at least an LED 113, at least an optical film 114, and a lens device 120 disposed on the optical path of the LED 113.

The lens device 120 comprises a lens 121 and a patterned light shielding layer 122. The reflector 112 is disposed on the back plate 111 for reflecting the light emitted from the LED 113 to the lens 121. The optical film 114 can be realized by a diffusion film or a light gathering film for diffusing or gathering the light emitted from the LED 113. The luminance of the light is enhanced when the light is gathered by the optical film 114. The LED 113 is disposed on the reflector 112, and the light emitted from the LED 113 is outputted through the lens 121. In an embodiment, the LED 113 comprises blue grains and a sealant doped with yellow fluorescent powder. When the light of blue grains passes through the yellow fluorescent powder of the sealant, the blue light is converted into a white light and outputted accordingly.

The lens 121 has a middle light emitting surface 121m and a periphery light emitting surface 121e surrounding the middle light emitting surface 121m. In the present embodiment, the light emitting surfaces (121m and 121e) of the lens 121 are convex surfaces and belong to refractive light emitting surfaces. In another embodiment, the light emitting surface of the lens 121 can be realized by a reflective light emitting surface, or a combination of a refractive light emitting surface and a reflective light emitting surface.

The patterned light shielding layer 122 can be formed on the periphery light emitting surface 121e of the lens 121 by a coating process. Since the patterned light shielding layer 122 is formed by way of coating, its thickness is very small. In an embodiment, the patterned light shielding layer 122 can be realized by an ink layer whose reflectivity is higher than 80% for enhancing the reflective capability of the patterned light shielding layer 122. Or, the patterned light shielding layer 122 can be realized by a white light shielding layer for reflecting the light. In another embodiment, the patterned light shielding layer 122 can be realized by an ink layer whose reflectivity is higher than 80%. To be more specifically, the patterned light shielding layer 122 can use a white solder mask.

The patterned light shielding layer 122, being formed on the periphery light emitting surface 121e of the lens 121, is capable of shielding the light outputted through the periphery light emitting surface 121e of the lens 121, hence reducing the color difference between the light outputted through the middle light emitting surface 121m and the light outputted through the periphery light emitting surface 121e.

Figure 2:
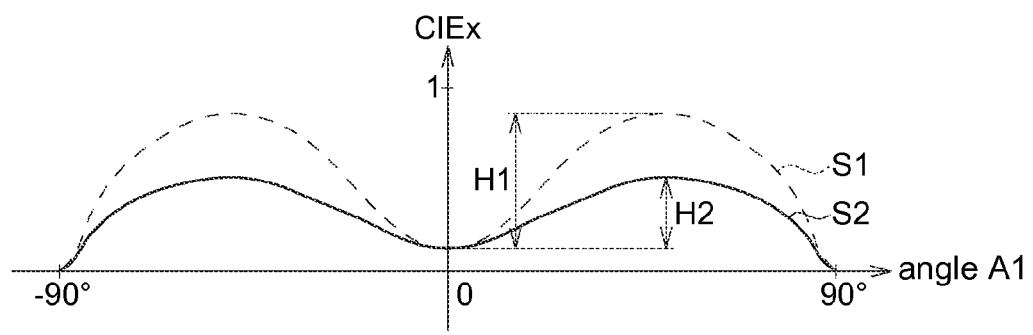
FIG. 2 is a light color distribution diagram of the light of an LED of FIG. 1 passing through the lens.

Referring to FIG. 2, a light color distribution diagram of the light of an LED of FIG. 1 passing through the lens is shown. Curve S1 represents color distribution of the light outputted through the lens 121 when the patterned light shielding layer 122 is omitted. Curve S2 represents color distribution of the light outputted through the lens 121 according to an embodiment of the invention. The peak of the curve S2 corresponds to a region with largest color difference between the light outputted through the periphery light emitting surface 121e and the light outputted through the middle light emitting surface 121m. Preferably but not restrictively, the patterned light shielding layer 122 of the present embodiment of the invention is formed on this region. As indicated in FIG. 2, in comparison to the curve S1 (the patterned light shielding layer 122 is omitted), the patterned light shielding layer 122 of the present embodiment of the invention shields the light and makes the light color difference between the light outputted through the periphery light emitting surface 121e and the light outputted through the middle light emitting surface 121m reduced to H2 from H1.

Figure 3:
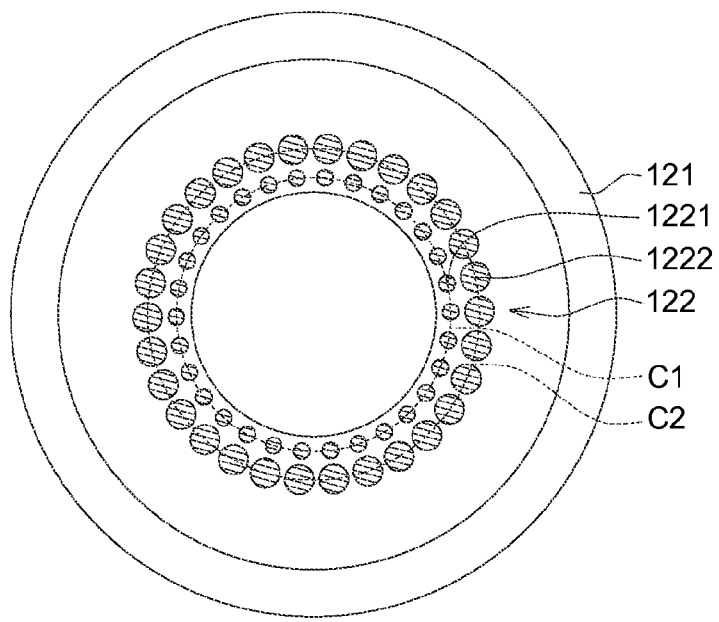
FIG. 3 is a top view of a lens and a patterned light shielding layer of FIG. 1.

Referring to FIG. 3, a top view of a lens and a patterned light shielding layer of FIG. 1 is shown. The patterned light shielding layer 122 comprises a plurality of light shielding spots (1221 and 1222) arranged as at least a row of annular patterns. For instance, the light shielding spots comprise a plurality of first light shielding spots 1221 and a plurality of second light shielding spots 1222 respectively arranged as a first annular pattern C1 and a second annular pattern C2 on the lens 121. The second annular pattern C2 surrounds the first annular pattern C1. The first annular pattern C1 and the second annular pattern C2 have such as a circular, elliptical or polygonal shape.

The area of each second light shielding spot 1222 is larger than that of each first light shielding spot 1221. That is, the second light shielding spots 1222 having larger area surround the first light shielding spots 1221 having smaller area. Besides, the first light shielding spots 1221 are mutually separated by an interval. That is, the first light shielding spots 1221 do not contact each other directly. However, the first light shielding spots 1221 can contact each other directly in another embodiment. The characteristics of the contact between the second light shielding spots 1222 are similar to that of the first light shielding spots 1221, and the similarities are not repeated here.

In addition, the first light shielding spots 1221 can have a circular, elliptical or polygonal shape. Although the shape of the first light shielding spots 1221 is exemplified by a circular shape, the present embodiment of the invention is not limited thereto. The shape of the second light shielding spots 1222 can be similar to that of the first light shielding spots 1221, and the similarities are not repeated here. The first light shielding spots 1221 and that of the second light shielding spots 1222 have the same shape in the present embodiment but have different shapes in another embodiment.

The geometric characteristics of the first light shielding spots 1221, the second light shielding spots 1222, the first annular pattern C1 and the second annular pattern C2 are based on the actual color difference of the light, not for limiting the scope of protection of the invention.

Figure 4:
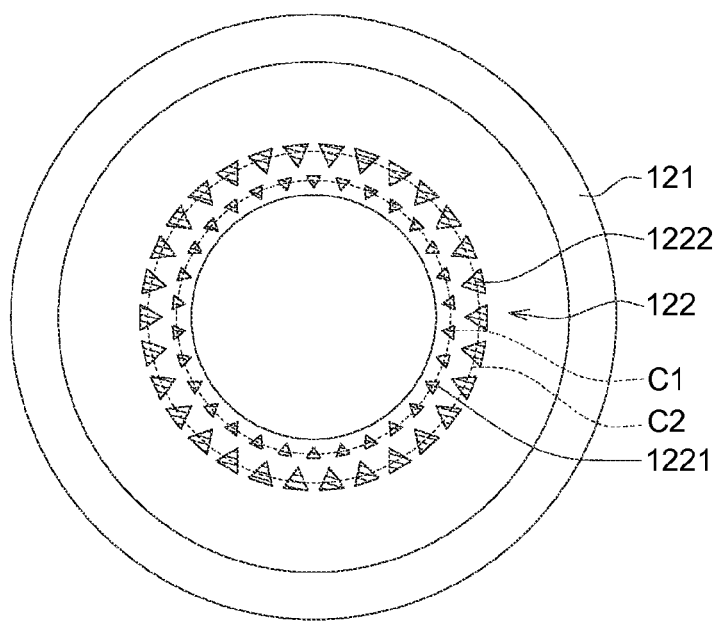
FIG. 4 is a top view of a lens and a patterned light shielding layer according to another embodiment of the invention.

Referring to FIG. 4, a top view of a lens and a patterned light shielding layer according to another embodiment of the invention is shown. Unlike the light shielding spots 1221 and 1222 of FIG. 3, the first light shielding spots 1221 and the second light shielding spots 1222 of the present embodiment of the invention have a triangular shape.

Figure 5:
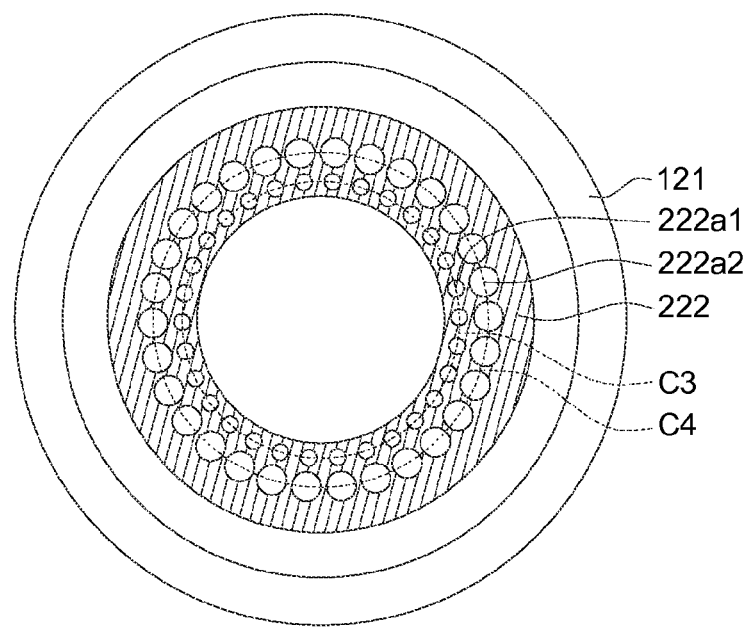
FIG. 5 is a top view of a lens and a patterned light shielding layer according to of the invention another embodiment.

Referring to FIG. 5, a top view of a lens and a patterned light shielding layer according to another embodiment of the invention is shown. Unlike the patterned light shielding layer 122 of FIG. 3, the patterned light shielding layer 222 has an annular and has a plurality of hollowed spots (222a1 and 222a2) arranged as at least an annular pattern. For instance, the hollowed spots comprise a plurality of first hollowed spots 222a1 and a plurality of second hollowed spots 222a2 respectively arranged as a third annular pattern C3 and a fourth annular pattern C4 on the lens 121. The fourth annular pattern C4 surrounds the third annular pattern C4. The area of each second hollowed spot 222a2 is larger than that of each first hollowed spot 222a1. That is, the second hollowed spots 222a2 having larger area surround the first hollowed spots 222a1 having smaller area. Besides, the first hollowed spots 222a1 are mutually separated by an interval. That is, the first hollowed spots 222a1 do not contact each other directly. However, the first hollowed spots 222a1 can contact each other directly in another embodiment. The characteristics of the contact between the second hollowed spots 222a2 are similar to that of the first hollowed spots 222a1, and the similarities are not repeated here.

In addition, the first hollowed spots 222a1 can have a circular, elliptical or polygonal shape. Although the shape of the first hollowed spots 222a1 is exemplified by a circular shape, the present embodiment of the invention is not limited thereto. The shape of the second hollowed spots 222a2 can be similar to that of the first hollowed spots 222a1, and the similarities are not repeated here. The first hollowed spots 222a1 and that of the second hollowed spots 222a2 have the same shape in the present embodiment but have different shapes in another embodiment.

The geometric characteristics of the first hollowed spots 222a1, the second hollowed spots 222a2, the third annular pattern C3 and the fourth annular pattern C4 are based on the actual color difference of the light, not for limiting the scope of protection of the invention.

Figure 6:
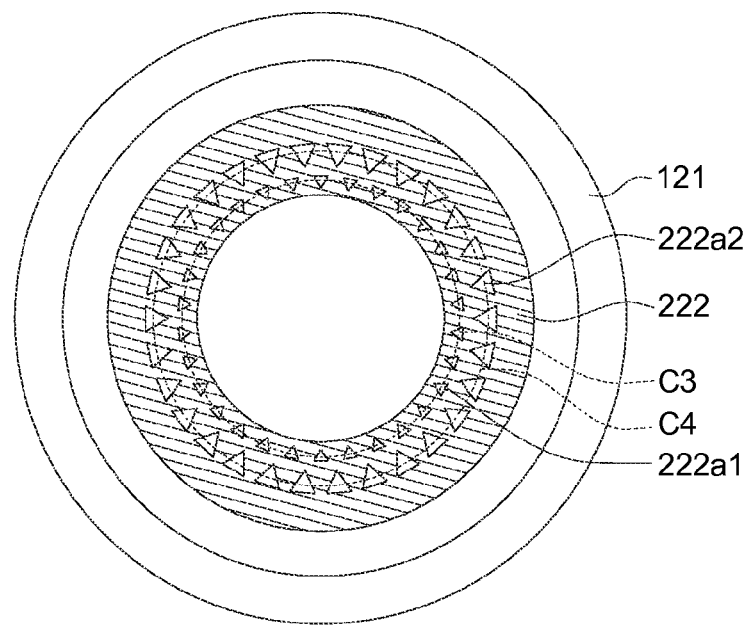
FIG. 6 is a top view of a lens and a patterned light shielding layer according to another embodiment of the invention.

Referring to FIG. 6, a top view of a lens and a patterned light shielding layer according to another embodiment of the invention is shown. Unlike the first hollowed spots 222a1 and the second hollowed spots 222a2 of FIG. 5, the first hollowed spots 222a1 and the second hollowed spots 222a2 of the present embodiment of the invention have a triangular shape.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens device, comprising:
   a lens having a middle light emitting surface and a periphery light emitting surface, wherein the periphery light emitting surface surrounds the middle light emitting surface; and
   a patterned light shielding layer formed on the periphery light emitting surface of the lens and separated from a boundary of the periphery light emitting surface;
   wherein the patterned light shielding layer has an annular shape and has a plurality of hollowed spots arranged as at least an annular pattern.

2. The lens device according to claim 1, wherein the patterned light shielding layer is an ink layer.

3. The lens device according to claim 2, wherein a color of the ink layer is white.

4. The lens device according to claim 3, wherein the reflectivity of the white ink layer is higher than 80%.

5. The lens device according to claim 1, wherein the patterned light shielding layer comprises a plurality of light shielding spots arranged as at least a row of an annular pattern.

6. The lens device according to claim 5, wherein a shape of each light shielding spot is a circular, elliptical or polygonal shape.

7. The lens device according to claim 5, wherein the light shielding spots are mutually separated by an interval.

8. The lens device according to claim 5, wherein the light shielding spots comprise a plurality of first light shielding spots and a plurality of second light shielding spots, the first light shielding spots are arranged as a first annular pattern on the lens, the second light shielding spots are arranged as a second annular pattern on the lens, and the second annular pattern surrounds the first annular pattern.

9. The lens device according to claim 8, wherein an area of each second light shielding spot is larger than that of each first light shielding spot.

10. The lens device according to claim 1, wherein a shape of each hollowed spot is a circular, elliptical or polygonal shape.

11. The lens device according to claim 1, wherein the hollowed spots are mutually separated by an interval.

12. The lens device according to claim 1, wherein the hollowed spots comprises a plurality of first hollowed spots and a plurality of second hollowed spots, the first hollowed spots are arranged as a third annular pattern on the lens, the second hollowed spots are arranged as a fourth annular pattern on the lens, and the fourth annular pattern surrounds the third annular pattern.

13. The lens device according to claim 12, wherein an area of each second hollowed spot is larger than that of each first hollowed spot.

14. A light source module, comprising:
a light emitting diode (LED); and
a lens device according to claim 1 disposed on an optical path of the LED.

15. The light source module according to claim 14, further comprising at least an optical film disposed on the optical path of the lens device.

16. A light source module, comprising:
a LED; and
a lens device according to claim 2 disposed on an optical path of the LED.

17. A light source module, comprising:
a LED; and
a lens device according to claim 3 disposed on an optical path of the LED.

18. A light source module, comprising:
a LED; and
a lens device according to claim 4 disposed on an optical path of the LED.

19. A light source module, comprising:
a LED; and
a lens device according to claim 5 disposed on an optical path of the LED.

* * * * *